United States Patent

Tat

[19]

[11] Patent Number: 5,864,759

[45] Date of Patent: Jan. 26, 1999

[54] RADIO TELEPHONES AND METHODS OF OPERATION

[75] Inventor: Nguyen Quan Tat, Surrey, England

[73] Assignee: Nokia Mobile Phones Limited, Salo, Finland

[21] Appl. No.: 688,560

[22] Filed: Jul. 30, 1996

[30] Foreign Application Priority Data

Aug. 3, 1995 [GB] United Kingdom .................... 9515957

[51] Int. Cl.⁶ .............................. H04Q 7/00; H04Q 9/00
[52] U.S. Cl. .................... 455/437; 455/436; 455/450; 455/464
[58] Field of Search ................................ 455/437, 436, 455/450, 464

[56] References Cited

U.S. PATENT DOCUMENTS

| | | | |
|---|---|---|---|
| 5,214,687 | 5/1993 | Kansakoski et al. | 379/60 |
| 5,260,943 | 11/1993 | Comroe et al. | 455/33.2 |
| 5,276,691 | 1/1994 | Kivari | 371/47.1 |
| 5,345,448 | 9/1994 | Keskitalo | 370/95.3 |
| 5,410,733 | 4/1995 | Niva et al. | 455/33.2 |
| 5,428,816 | 6/1995 | Barnett et al. | 455/33.2 |
| 5,471,670 | 11/1995 | Hess et al. | 455/33.2 |
| 5,483,668 | 1/1996 | Malkamaki et al. | 455/33.2 |
| 5,499,386 | 3/1996 | Karlsson | 455/33.2 |
| 5,524,009 | 6/1996 | Tuutijarvi et al. | 370/95.3 |
| 5,551,058 | 8/1996 | Hutcheson et al. | 455/33.2 |

FOREIGN PATENT DOCUMENTS

| | | |
|---|---|---|
| 1 568 262 | 5/1980 | United Kingdom . |
| 2 173 377 | 10/1986 | United Kingdom . |
| 2 260 242 | 4/1993 | United Kingdom . |
| 2 275 589 | 8/1994 | United Kingdom . |
| 2 277 849 | 11/1994 | United Kingdom . |
| WO92/08325 | 5/1992 | WIPO . |

*Primary Examiner*—Donnie L. Crosland
*Attorney, Agent, or Firm*—Perman & Green, LLP

[57] ABSTRACT

A method and apparatus for detecting additional base stations in a cellular radio telephone system in which communication channels are opened with a selected base station on a selected channel.

5 Claims, 4 Drawing Sheets

CHANNEL LIST ON PORTABLE HANDSET

SLOT →

| 0 | 0 | 1 | 0 | 0 | 0 | 1 | 0 | 0 | 0 | 0 | 0 |
|---|---|---|---|---|---|---|---|---|---|---|---|
| 1 | 0 | 0 | 0 | 1 | 0 | 0 | 0 | 0 | 1 | 0 | 3 |
| 0 | 0 | 0 | 0 | 0 | 0 | 0 | 0 | 0 | 0 | 0 | 0 |
| 0 | 0 | 0 | 0 | 1 | 0 | 0 | 1 | 0 | 0 | 1 | 0 |
| 0 | 2 | 0 | 0 | 9 | 0 | 0 | 0 | 8 | 0 | 5 | 0 |
| 0 | 0 | 0 | 0 | 3 | 0 | 0 | 0 | 0 | 0 | 0 | 0 |
| 2 | 0 | 2 | 1 | 0 | 0 | 0 | 0 | 0 | 2 | 0 | 4 |
| 0 | 2 | 7 | 0 | 0 | 0 | 0 | 0 | 0 | 9 | 0 | 0 |
| 1 | 0 | 1 | 0 | 0 | 1 | 0 | 0 | 0 | 2 | 0 | 0 |
| 9 | 0 | 0 | 0 | 0 | 0 | 0 | 3 | 0 | 0 | 0 | 1 |

↕ CARRIER

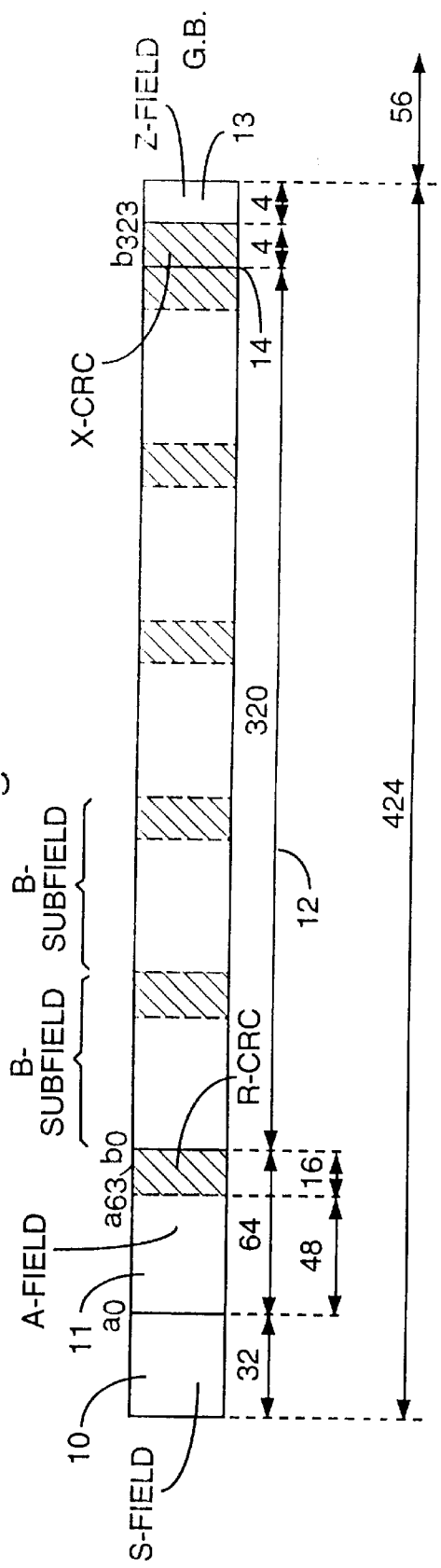
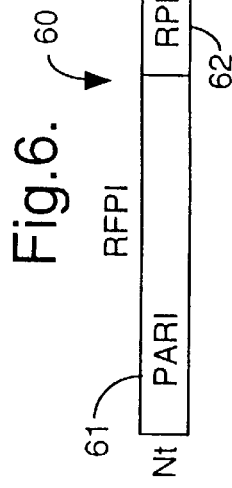

RADIO TELEPHONES AND METHODS OF OPERATION

BACKGROUND OF THE INVENTION

This invention relates to portable radio telephones and particularly but not exclusively to such telephones for communication with base stations in a digital cellular radio telephone system employing transmission by a plurality of carrier frequencies in frames, such as TDMA frames, each consisting of a predetermined number of time slots. The invention also relates to a method of operation of such radio telephones, frequently called handsets.

Each cell of a cellular system is supported by a base station. Each base station has a maximum capacity. In order to increase the capacity of the system another base station can be added. This increases the maximum number of concurrent users. In systems in which two base stations can operate with overlapping cells, more than one base station can provide coverage for a particular area if the concentration of users is high.

Handsets are in communication with a base station via an available over the air communication channel. Allocation of a channel to a handset when a connection is first required is called "call set-up". In order to set up a call the handset must be in 'idle lock' i.e. monitoring the system with no call in progress. When a traffic channel has been assigned the handset is in 'active lock'. When a change in channel is required during a call to maintain call quality this is termed "handover". Handover can either be to a different channel at the same base station (intracell) or to a different channel at a different base station (intercell).

If a handset carries channel selection algorithms, in both idle and active lock the handset scans the available channels to gain information useful for call set up or handover. The Radio Signal Strength Indicator (RSSI) of each channel is monitored at regular time intervals and the measured signal strengths are stored in a channel list.

The RSSI information indicates to the handset which channels have bearers. A high RSSI indicates a bearer. This is not foolproof as a high RSSI may also be the result of noise or interference between channels but it is a good guide. The RSSI information alone does not indicate which base station is transmitting on a particular channel.

A handset will scan the bearer channels periodically to determine the RSSI information necessary for call set up or handover. Once it is determined that a new channel is needed either for call set up or for handover, the handset uses the RSSI information from the most recent scan.

In order to select a traffic channel the handset must identify both the channel and base station. A problem may arise when a handset needs to open a communication channel through a base station other than the one to which it is currently locked i.e. the current base station. This may be necessary, for example, if the current base station is at capacity. The problem occurs because a handset will typically only look for the strongest base station as an alternative to the current base station for a new channel.

Using the RSSI information gathered periodically the strongest base station can be identified by monitoring the channel with the highest RSSI. A quiet channel can be selected on that base station by selecting a channel with a low RSSI. In the absence of additional information it is not possible to select a base station other than the current or strongest base station. Once a handset has determined that the base station to which it is locked is at capacity, it is a matter of chance whether or not there is a stronger base station with which the handset can attempt call set up or handover. If the current base station is the strongest, no other base station can be selected.

If another base station is stronger and that is also at capacity no other base stations can be selected with the information available to the handset.

The handset's options for channel selection are, therefore, limited to channels on the current, or strongest base station if this is different to the current base station. This has severe consequences when either the current base station is strongest and at capacity or both the current and the strongest base stations are at capacity, as this results in the handset in idle lock being unable to make or receive a call. It also means a handset in active lock will lose a call-in-progress if the channel deteriorates unless this is the result of the handset moving out of the range of one base station into the range of another.

SUMMARY OF THE INVENTION

In accordance with first and second aspects of the present invention there is provided a radio handset for communication with a selected base station on a selected channel in a cellular radio telephone system in which a bearer is monitored to receive system information from a current base station, comprising processing means operative to cause identification of a base station with which to communicate on a selected channel in response to an indication that a channel on a base station other than a current base station is sought, by monitoring respective bearer channels until a bearer transmitted by a base station capable of allocating a communication channel to the handset is detected and a method for communication between a handset and a selected base station on a selected channel in a cellular radio telephone system in which a bearer is monitored to receive system information from a current base station comprising, in response to an indication that a channel on a base station other than the current base station is sought, monitoring respective bearer channels until a bearer transmitted by a base station capable of allocating a communication channel to the handset is detected.

By providing a method and apparatus for identifying additional base stations, additional base stations can be readily added to a system to increase the number of concurrent users in a particular area.

By removing the strongest signal criterion for selection of a bearer when a different base station is required, the present invention allows other base stations located in the vicinity of the handset to be utilised even if these are weaker than the current base station. As a consequence, calls will not automatically be lost because the channel being used deteriorates when the base station is at full capacity. Call set up will also not be impeded when the closest base station is at full capacity provided there are other base stations in the vicinity.

By waiting for an indication that a channel on a different base station is sought before identifying a different base station, there is no need to build a list of available base stations in advance. By reducing the amount of information it is necessary to gather during periodic routine scans, scan time and power expended in gathering information are kept down. In the present invention power is only expended to identify an additional base station when it becomes necessary.

The sequence in which the bearer channels are monitored to identify a different base station may be the order of the signal strength of the channels on which they are transmitting. Other criteria for the sequence of respective further bearer selection may, however, be adopted.

The identity of a base station is suitably determined by receiving identification information in a system information signal from the base station.

Once a suitable base station has been identified, a communication channel with that base station can be selected.

A base station will typically be capable of allocating a communication channel to the handset if it has available communication channels.

The identities of base stations determined to be incapable of allocating a channel to the handset are preferably noted and the identities of subsequently identified base stations compared with those noted. Bearer monitoring continues until a base station capable of allocating a communication channel to the handset is identified. A cut off period may be introduced by which time it is determined that no suitable base station is available.

As the traffic using a particular base station will vary over time, the noted identities are preferably retained for a predetermined period only. This can be fixed for a period beginning with the noting of the first base station after which all noted identities are erased. A record of each base station at full capacity could instead be retained for the same duration.

A base station may be considered to be at full capacity when the handset is unable to open a communication channel through that base station. This will typically be when the base station has no available communication channels.

BRIEF DESCRIPTION OF THE DRAWINGS

The invention will now be described in greater detail with reference to FIGS. 1 to 6 of the drawings of which:

FIG. 3 is a schematic representation of a signal packet under the DECT protocol;

FIG. 6 is a schematic representation of an Nt message;

DESCRIPTION OF THE PREFERRED EMBODIMENTS

Figure 1:
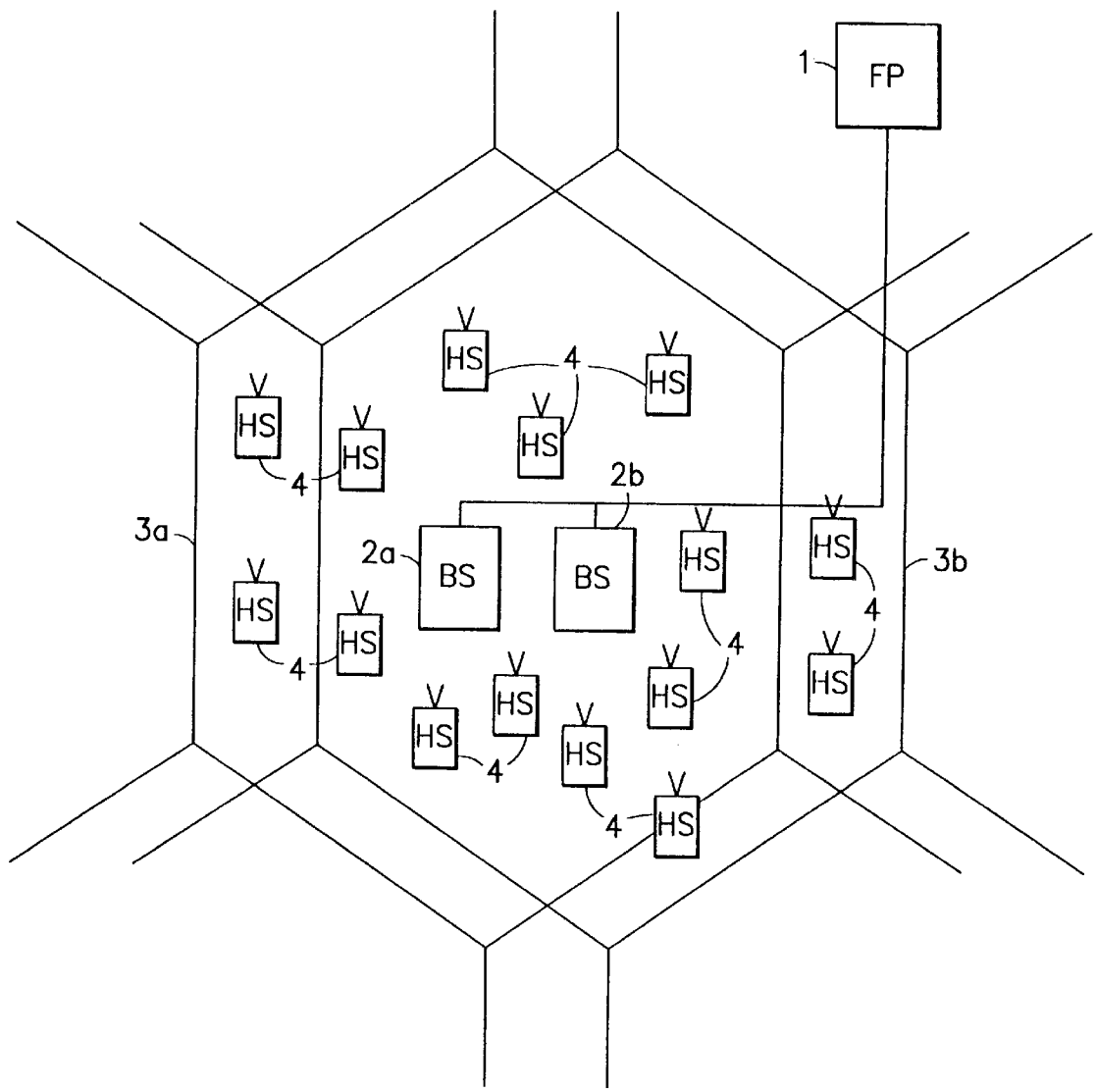
FIG. 1 is a schematic representation of overlapping cells of a system of the present invention.

In the described example shown in the drawings, the radio telephone system conforms to the DECT (Digital European Cordless Telecommunications) standard and uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset.

A DECT system typically includes one fixed part (FP) 1, several radio fixed parts 2 or base stations (BS), two of which 2a, 2b supporting respective overlapping cells 3a, 3b are illustrated in FIG. 1, and many portable parts or handsets (HS). 4 The fixed part is physically connected to a standard wireline telephone system, each radio fixed part 2 is physically connected to the fixed part. In a DECT system the handset carries the algorithm or algorithms for channel selection in its processor.

The handset 4 has an antenna 5, a transceiver 6 and processing means 7 programmed with an algorithm which is operative to select a communication channel with a base station. Information is displayed on a Liquid Crystal Display (LCD) 8.

Most currently manufactured DECT base stations contain a single transceiver and are therefore unable to open more than a single communication channel, a combination of time slot and frequency, on different frequency carriers in the same time slot. A time slot already having a traffic channel is 'blind'. This means that although the number of channels available for selection is the number of carriers multiplied by the number of time slots, the maximum number of concurrent users is restricted to the number of available time slots i.e. twelve. The DECT protocol allows for the addition of extra base stations to enable more concurrent users in a particular area if desired.

The DECT standard includes a blind slot information message sent by a base station to inform the handset of time slots it should avoid for selecting a channel. In addition to slots 'blinded' by the base station, a handset 'blinds' channels itself as it is typically unable to switch communication channels to a slot immediately adjacent to that to which it is currently locked.

In both idle and active lock, the handset monitors signals transmitted by a current base station to receive system information. A signal packet is transmitted each frame on active and dummy channels. Each signal packet is divided into four fields only one of which transmits system information. The signal packet structure is illustrated in FIG. 3. The S-field 10 used for synchronisation, and the A-field 11 used to send signalling information in accordance with the DECT protocol are both used when locking on. The B-field 12 is used for sending speech or data to a system user and the Z-field 13 is provided specifically for sliding error detection. In addition to the Z-field, the A and B fields have their own error detection sub-fields known as Cyclic Redundancy Checks 14 (CRCs). The A-field is 64 bits long with the final 16 bits providing a error check on the preceding 48 bits. In idle lock system information is transmitted in these signal packets by the base station to allow the handset to select a channel for call set up. In active lock, system information is gathered to allow the handset to select a stronger channel for handover if this becomes necessary.

In order to select a channel either for call set up or handover, information on the RSSI for the channels of the system is utilised. In both idle and active lock the handset builds a picture of the signal strength of each channel. The range of signal levels is typically between −93 dBm and −33 dBm. This range can be divided into ten levels each covering 6 dB. The levels are indicated by a number termed a bin value between 0 and 10; 10 indicating high signal strength and 0 low signal strength.

Figures 2, 4:
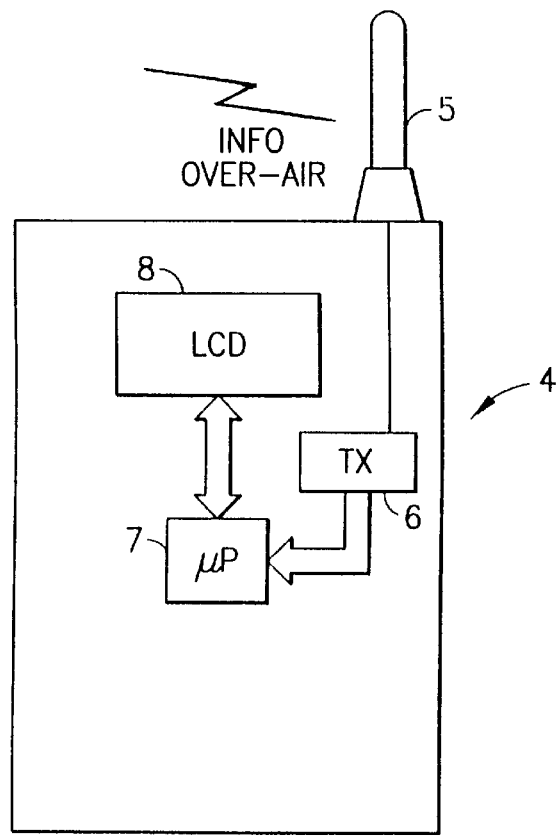
FIG. 2 is a schematic representation of a handset in accordance with the present invention.
FIG. 4 is a schematic representation of the RSSI information known to a handset.

FIG. 4 illustrates exemplary RSSI channel information available to a handset in idle or active lock.

When selecting a channel for either call set up or handover the handset will have the RSSI information and also the blind slot information relevant to the base station it is currently monitoring. It will select a channel on one of the available time slots on the basis of the RSSI information gathered.

When in active or idle lock the handset will know from the blind slot information if the base station to which it is locked is at full capacity. As the traffic on any base station is dynamic, a handset continues in idle lock to a base station even if that base station is at full capacity. This is because a channel may well be available on that base station when call setup is eventually requested.

Figure 5:
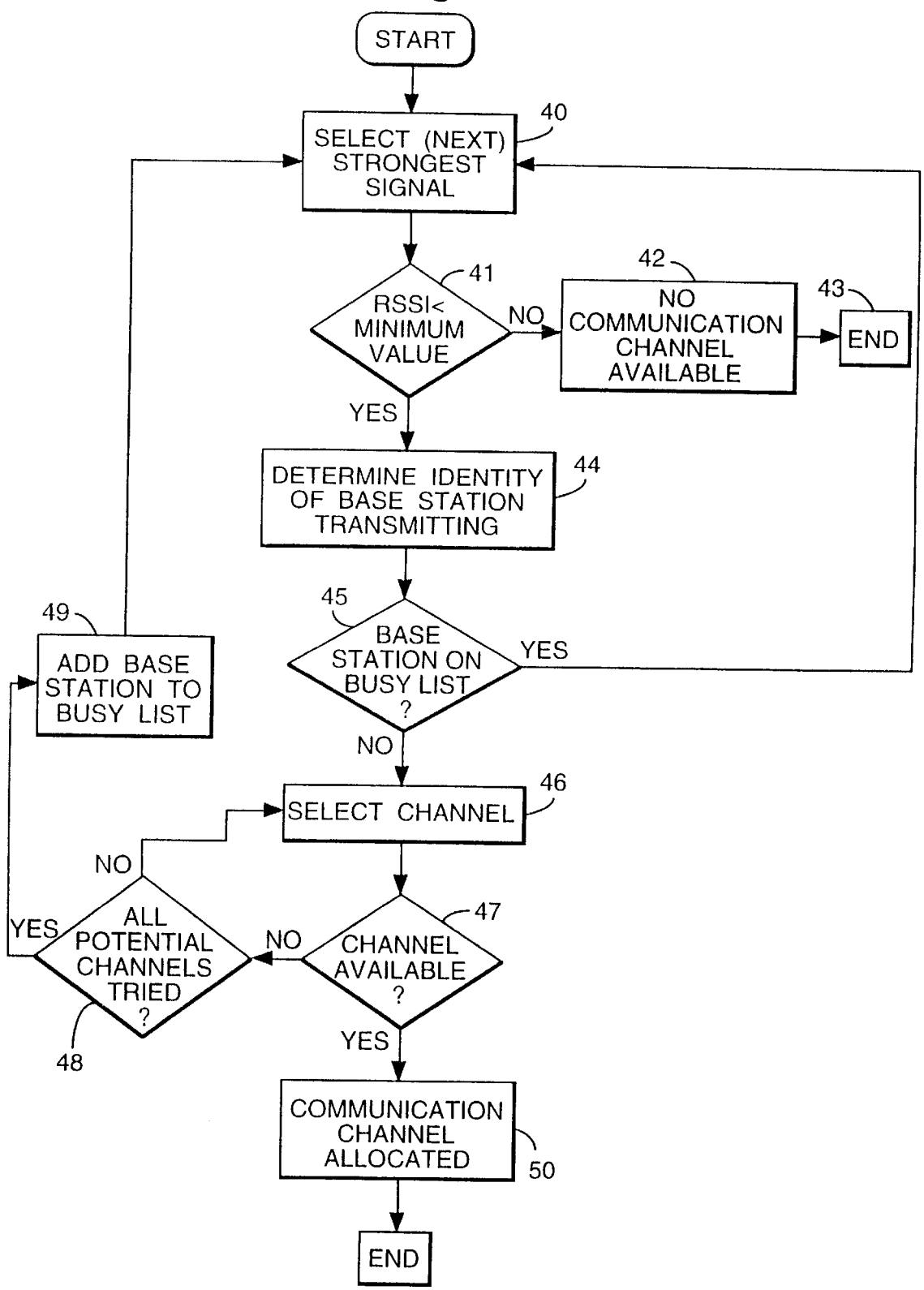
FIG. 5 is a flow chart illustrating an embodiment of the invention.

To select a channel for handover or call set up the procedure is the same. The handset monitors the currently strongest channel 40 (FIG. 5) to determine the closest base station, and checks that the base station meets minimum RSSI requirements 41. If it does not, no communication channel is available 42 for handover or call set up and the process ends 43. If it does, the base station transmitting the strongest signal is identified 44 and a check is made as to whether that base station is on a busy list 45 held by the handset. The busy list is a list of base stations previously identified, say during the previous 20 seconds, by the handset to be unable to allocate a channel. If the base station does appear on the busy list the handset selects the channel with the next highest RSSI from the channel list 40, and repeats the process until a base station not previously identified as busy is found. For each subsequently identified base station, if it does not have an available channel, the RPN of that base station is added to the busy list and the process continues.

If the base station is not on the busy list, the handset selects a channel on that base station 46 using the RSSI information in the channel list of FIG. 4 and, where available, blind slot information transmitted by the base station. If a base station other than the current base station is selected, blind slot information may not be transmitted by the base station before a channel selection attempt is made. In this case the handset selects channels using a handover algorithm held in its processor until a suitable channel is found or the base station is determined to be at capacity. One example of a suitable algorithm is described in the applicant's copending application GB 9500799.3.

The quality criteria for channel selection may be as follows:

1. The quietest available channel;
2. If this quietest channel cannot be attempted within the next three frames (i.e. it is within three carriers of the current primary scan of the base station) a channel that can be attempted within three frames can be selected if it is within 2 bands of the quietest, otherwise the quietest is selected.

If a selected channel is not available 47, the handset determines if all potential channels on that base station have been tried 48 and if the answer is 'yes' adds the identity of that base station to its busy list 49. A handset may determine that a base station is at full capacity because of blind slot information or, if blind slot information is not available, if the handset is unable to find an available channel on that base station after a suitable number of attempts.

Under the DECT protocol each base station of a fixed part has its own unique Radio Fixed Part Identity (RFPI) illustrated in FIG. 6. This is broadcast in an Nt message in the S field of the signal. The RFPI 60 has two parts, a Portable Access Right Identity (PARI) 61 and a Radio Part Number (RPN) 62. For base stations operating from the same Fixed Part the PARI will be the same, the RPN will, however, be different. The RPN is transmitted by the base station in an Nt message. This type of message is received by a handset in both idle and active lock. When a base station is determined to be at full capacity it is the RPN of the base station that is held in the busy base station list.

If the handset has determined that there are no available channels on a particular base station 46, 47, 48 the handset monitors the next strongest channel 40 using the RSSI information held in the channel list, to try to find a new base station and the process is repeated. Although in this embodiment of the present invention, RSSI scans are suspended during handover or call set up, the RSSI scan may optionally be updated during handover or call set up. Under these circumstances, channel selection to identify a base station will start with the strongest channel each time the RSSI scan is refreshed. Thereafter channels would be monitored in sequence preferably in signal strength order until either a suitable base station is found or the RSSI information is updated again.

As the channel allocation pattern is dynamic, a base station is likely to be at capacity only temporarily. In one suitable embodiment all RPNs are removed from the busy list twenty seconds after the RPN of the first busy base station is entered on the list. This enables a base station to be tried again at least every twenty seconds by which time it may well have a channel available. Other time periods or ways of managing the busy list are, however, envisaged. For example, each RPN could be removed from the list a fixed period after it is entered.

Once a channel selected 46 is available 47, the channel is allocated 50, and the handset can set up a call on that channel if in idle lock or handover to that channel if in active lock.

The present invention enables a channel on a new base station to be selected without the need to determine which base stations are in the vicinity in advance. This provides the advantage of both reduced scan time and reduced battery consumption for the routine periodic scans gathering information for call set up or handover.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention in particular the invention is applicable for use under other protocols including Wireless Customer Premises Equipment (WCPE) and Personal Handyphone System (PHS).

I claim:

1. A method for allocating to a radio handset a communication channel of one of a plurality of base stations in a cellular radio telephone system, the method performed at the radio handset comprising the steps of:

generating an indication that a new communication channel is required;

only in response to the indication being generated, initiating a monitoring of communication channels, the communication channels being monitored in a sequence determined by at least one criterion;

selecting a communication channel being monitored and identifying a base station transmitting the selected communication channel;

determining if the identified base station has an available channel; if yes, establishing communication with the identified base station; else, recording an indication that the identified base station does not have an available channel and selecting a next communication channel to be monitored in the sequence determined by the at least one criterion.

2. A method for allocating to a radio handset a communication channel as set forth in claim 1, wherein the at least one criterion is comprised of a received signal strength.

3. A method for allocating to a radio handset a communication channel as set forth in claim 2, wherein if the communication channels being monitored are not above a predetermined signal strength threshold then no communication channels are available.

4. A method for allocating to a radio handset a communication channel as set forth in claim 1, wherein the step of recording the indication that the identified base station does not have an available channel includes a step of adding the identified base station to a list of currently unavailable base stations.

5. A method for allocating to a radio handset a communication channel as set forth in claim 4, wherein the list of currently unavailable base stations is comprised of a busy base station list.

* * * * *